United States Patent [19]
Mori

[11] Patent Number: 6,079,883
[45] Date of Patent: *Jun. 27, 2000

[54] CAMERA HAVING MULTIPURPOSE COVER

[76] Inventor: Hiroshi Mori, 5-5, Yougonaka 4-chome, Matsuyama-shi, Ehime, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/064,186

[22] Filed: Apr. 22, 1998

[30] Foreign Application Priority Data

Apr. 22, 1997 [JP] Japan ................................. 9-004505
May 30, 1997 [JP] Japan ................................. 9-141265

[51] Int. Cl.[7] .................................................. G03B 17/24

[52] U.S. Cl. ...................... 396/348; 396/448; 396/535; 396/544; 359/610

[58] Field of Search .................................. 396/348, 448, 396/535, 544; 359/610

[56] References Cited

U.S. PATENT DOCUMENTS

| | | | |
|---|---|---|---|
| 1,427,592 | 8/1922 | Hales | 359/610 |
| 1,463,938 | 8/1923 | Carter | 359/610 |
| 2,783,696 | 3/1957 | Sewig | 396/535 |
| 3,619,045 | 11/1971 | Nemeth | 352/14 |
| 3,840,883 | 10/1974 | Choate | 396/448 |
| 4,075,642 | 2/1978 | Niggeloh | 396/535 |
| 4,451,130 | 5/1984 | Yan | 396/348 |
| 5,765,066 | 6/1998 | Balling et al. | 396/348 |
| 5,794,084 | 8/1998 | Ikari | 396/448 |
| 5,797,044 | 8/1998 | Lawther et al. | 396/448 |

*Primary Examiner*—David M. Gray
*Attorney, Agent, or Firm*—Liniak, Berenato, Longacre & White

[57] ABSTRACT

A camera having a multi-purpose cover comprising a camera body having a multi-purpose cover provided thereon, the multi-purpose camera being provided in such a manner that the cover can outwardly move the outline of the camera body. The camera having a multi-purpose cover has improved handaling properties and enhanced protecting functions.

2 Claims, 6 Drawing Sheets

CAMERA HAVING MULTIPURPOSE COVER

BACKGROUND OF THE INVENTION

1. Field of the Invention

The present invention relates to a small-sized camera, and particularly to a small-sized camera having a multi-purpose cover, which can prevent the camera body from movement as not being held firmly enough, which can prevent a finger from being unduly photographed on the taken picture, and which can serve as a blind fitted to the camera body.

2. Prior Art

In general, when one wants to take a picture, one holds a camera by hands, the camera is faced towards a subject for photography, one peeps the subject through a finder of the camera body with the right eye while closing the left eye, one focuses the camera on the subject, and clicks a shutter of the camera.

However, the action of closing one of eyes involves the fatigue. In particular, when one takes a picture over a long period of time, the eyes are straining. Moreover, as described above, in the photography, one peeps the finder with the right eye while closing the left eye. However, being preoccupied with closing the left eye, the camera is slightly moved as not being held firmly enough, or a finger obstructs the lens and, thus, the finger is unduly photographed on the taken picture.

In addition, it is very inconvenient for someone who cannot close only left eye to use the camera. For this reason, if one takes a picture while opening both eyes, the taken picture is sometimes in the state where one end of the subject is missing, because it is difficult to judge whether the image is caught by the right eye or left eye.

Furthermore, in the recent camera products, particularly in the fields of advanced photo system (APS) camera and. disposable camera, many cameras are too small to be handled due to the heavy consideration of portability to sacrifice the handling properties. In these cameras, a space for holding the camera body by hands is too small, significantly leading to the problems concerned with movement of the camera and with a finger unduly photographed on the taken picture.

Also, depending upon the construction of the camera, no measure to deal with preventing the lens of the camera from being protected from dust, water-droplet, etc. is not taken.

SUMMARY OF THE INVENTION

The present invention has been accomplished in light of the above situations, and the object of the present invention is, therefore, to provide a small-sized camera having a multi-purpose cover, which can prevent the camera body from movement as not being held firmly enough, which can prevent a finger from being unduly photographed on the taken picture, and which can serve as a blind, fitted to the camera body.

The present invention relates to a camera having a multi-purpose cover comprising a camera body having a multi-purpose cover provided thereon, said multi-purpose camera being provided in such a manner that the cover can outwardly move along the outline of the camera body.

In the camera having a multi-purpose cover according to the present invention, said multi-purpose cover may be provided on a rear surface of the camera body in such a manner that it can be rotated.

Also, in the camera having a multi-purpose cover according to the present invention, said multi-purpose cover may be detachably provided to the communicating projection on a rear surface of the camera body.

Further, in the camera having a multi-purpose cover according to the present invention, said multi-purpose cover may be provided by a hinge on the camera body so that said multi-purpose camera can be opened and closed.

Still further, in the camera having a multi-purpose cover according to the present invention, said hinge on the camera body may be provided on a circumference of a ring which can rotate.

Furthermore, in the camera having a multi-purpose cover according to the present invention, said multi-purpose cover may be provided on the camera body in such a manner that said multi-purpose cover can slide in the straight direction.

Moreover, in the camera having a multi-purpose cover according to the present invention, said multi-purpose cover may be detachably provided on the camera body.

PREFERRED EMBODIMENT OF THE INVENTION

Figure 1A:
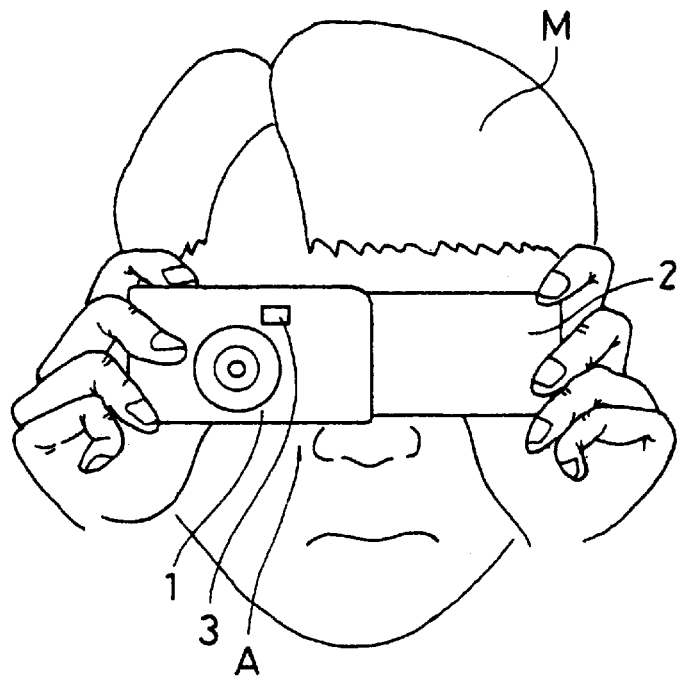
FIGS. 1A and 1B are a front view showing the state of taking a photograph by the camera having a multi-purpose cover according to the present invention.

Embodiments of the camera having a multi-purpose cover according to the present invention will now be described by referring to the drawings.

Figure 1B:
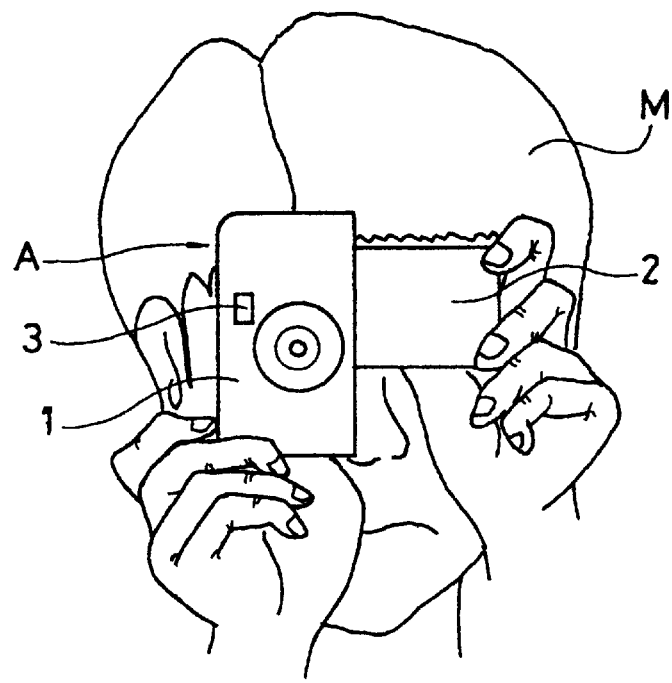
Figure 2:
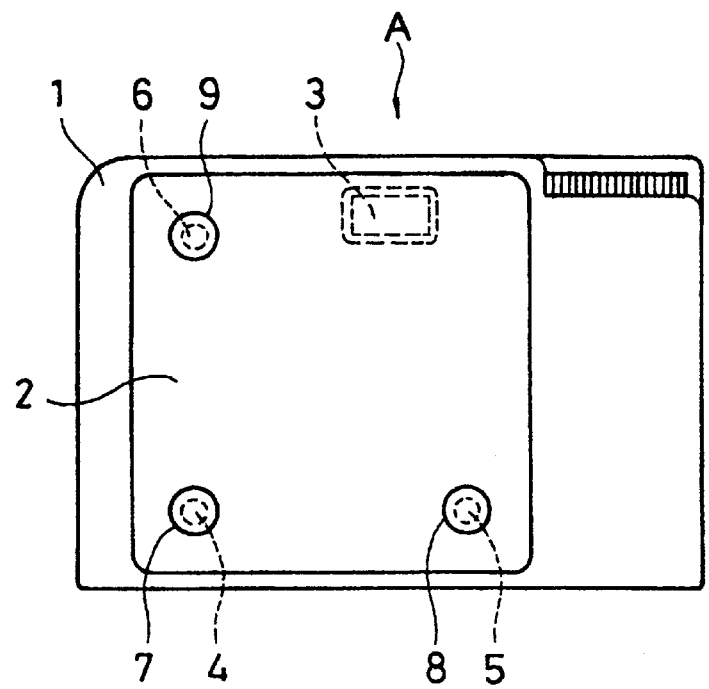
FIG. 2 is a rear view showing the camera having a multi-purpose cover according to the present invention.
Figure 3:
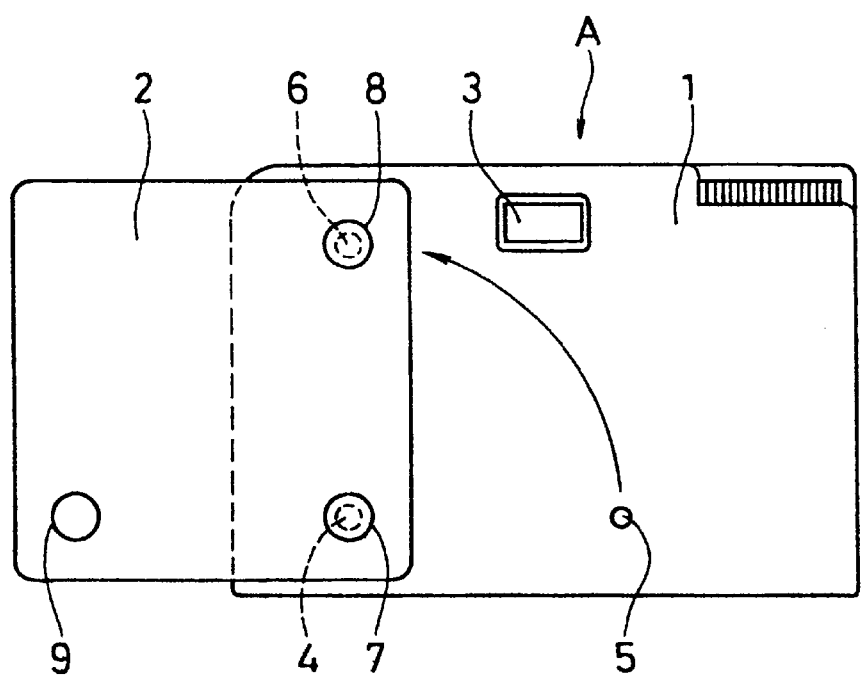
FIG. 3 is a development of the camera having a multi-purpose cover of FIG. 1 expanded in the crosswise direction.
Figure 4:
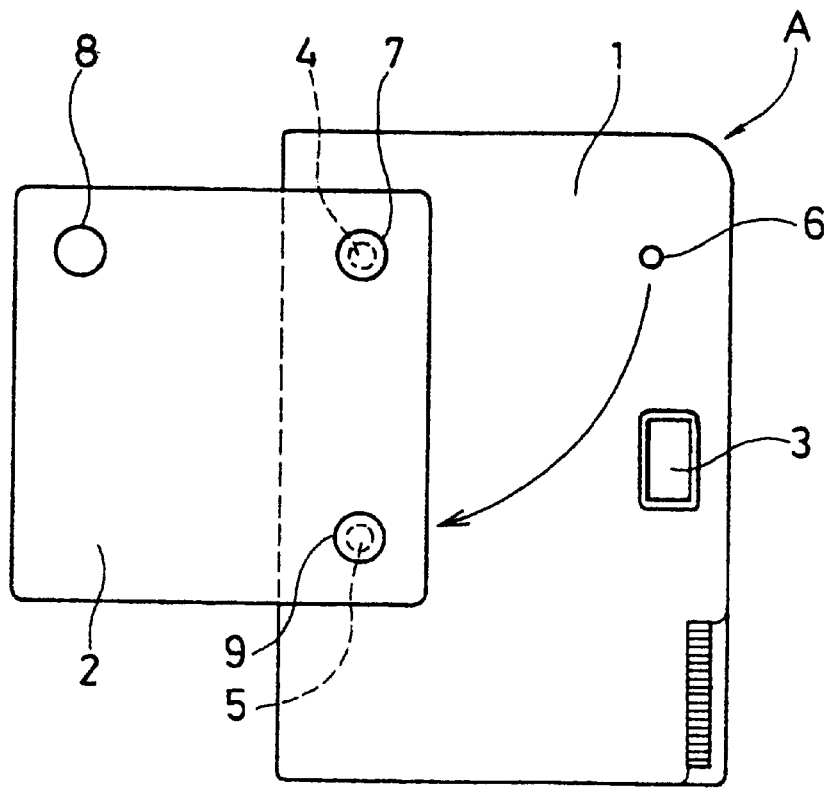
FIG. 4 is a development of the camera having a multi-purpose cover of FIG. 1 expanded in the lengthwise direction.

FIG. 1 is a front view showing the state of taking a photograph by the camera having a multi-purpose cover according to the present invention, FIG. 2 is a rear view showing the camera having a multi-purpose cover according to the present invention, FIG. 3 is a development of the camera having a multi-purpose cover of FIG. 1 expanded in the crosswise direction, and FIG. 4 is a development of the camera having a multi-purpose cover of FIG. 1 expanded in the lengthwise direction.

A camera body which can be used in the present invention is not restricted, and examples include all kinds of small-sized cameras such as APS cameras, digital cameras, and disposable cameras. A multi-purpose cover to be utilized in the present invention may be made of any material as long as it impairs the objects and the effects of the present invention, and examples thereof include flexible opaque synthetic resins and card boards although depending upon an embodiments and a kind of the camera body such as a normal small-sized camera, or a disposable camera.

As shown in FIG. 1A and FIG. 1B, a camera A having a multi-purpose cover according to the present invention is composed of a body 1 of the camera and a multi-purpose cover 2 (hereinafter referred to as "cover") The cover 2 is provided on the camera body 1 in such a manner that it can be moved by rotating, sliding or the movement of opening and closing.

When a picture is taken by the camera A having a multi-purpose cover, a finder 3 of the camera body 1 is brought into contact with the right eye of a photographer M to peep a subject (not shown) through the right eye. In this case, the cover 2 is outwardly moved along the outline of the camera body 1 and the cover 2 is brought into contact with the left eye of the photographer M so as to obstruct the field of the left eye's vision, whereby focusing on the subject through the right eye is not prevented even when the left eye is left opening and, at the same time, the movement of camera due to not being held firmly enough and the finger unduly photographed on the taken picture can be prevented by firmly holding the cover 2 by the left hand.

As shown in FIG. 2, in the camera A having a multi-purpose cover, three communicating projections 4, 5, and 6 are formed on a rear surface of the camera body 1. Corresponding to these communicating projections 4, 5, and 6, communicating concave portions 7, 8, and 9 are formed on the cover 2. By communicating the concave portion 7 with the projection 4, the concave portion 8 with the projection 5, and the concave portion 9 with the projection 6 by means of snapping etc., the cover 2 is provided on the camera body 1.

As for the situation of the communication relationship of the communicating projections 5 and 6 with the communicating concave portions 8 and 9, these dimensions are designed so that they are tightly communicated. In contrast, the communicating concave portion 7 is designed to have such a dimension that it is communicated with the communicating projection 4 in a loose manner, whereby the cover 2 can be rotated around the communicating projection 4.

Furthermore, as shown in FIG. 3, the distances between the communicating projections 4 and 5, and the distance between the communicating projections 4 and 6 of the camera body 1 are set to be the same as the distance between the communicating concave portions 7 and 8 and the distance between the communicating concave portions 7 and 9 of the cover 2.

As shown in FIG. 3, when the cover 2 is counterclockwise rotated around the communication projection 4 at an angle of 90 degree, the communicating concave portion 8 is moved at the position of the communicating projection 6, so that the communicating concave portion 8 can be communicated with the communicating projection 6. At this position, a picture can be taken using the camera body 1 in the horizontal direction as shown in FIG. 1A.

As shown in FIG. 4, when the cover 2 is clockwise rotated around the communicating projection 4 at an angle of 90 degree, the communicating concave portion 9 is moved at the position of the communication projection 5, so that the communicating concave portion 9 can be communicated with the communicating projection 5. At this position, a picture can be taken using the camera body 1 in the vertical direction as shown in FIG. 1B.

Moreover, the communicating concave portions 7, 8, and 9 can be detachable to the communicating projections 4, 5, and 6, respectively. Accordingly, once the cover 2 is taken out of the camera body 1 and the cover 2 is rotated to a voluntary angle, and then the cover 2 can, of course, be attached to the camera body 1.

EXAMPLES

Examples of the present invention will now be described on the basis of FIGS. 5 to 8.

Figure 5:
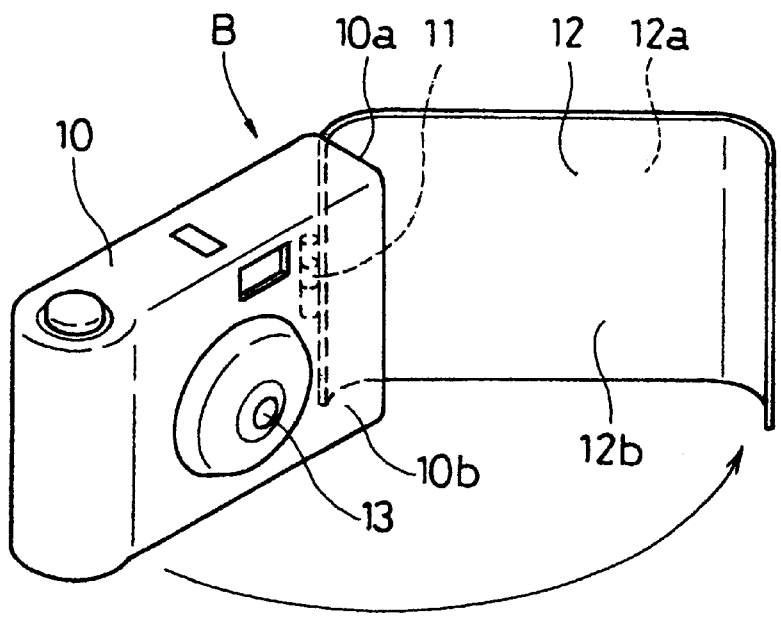
FIG. 5 is a perspective view showing the camera having a multi-purpose cover according to one embodiment of the present invention.

A camera B having a multi-purpose cover shown in FIG. 5 comprises a camera body 10 having a cover 12 provided thereon in such a manner that the cover 12 can be opened and closed by means of a hinge 11 provided on a side portion 10a of the camera body 10. The cover 12 is formed so as to entirely covers the front portion 10b of the camera body 1.

When picture is taken, the cover 12 is completely opened. Similar to FIG. 1, the cover 12 blocks the left eye of the photographer and, at the same time, it functions as a holding portion held by the left hand.

Other than taking a picture, the cover 12 is closed to entirely cover the front portion 10b of the camera body 1, so that the cover 12 can protect the lens 13 against dust and water-droplet.

Utilizing a space of the front surface 12a and/or the rear surface of the cover 12, a seal of favorite personality or character or so-called print club™, which is now coming into fashion and which is for making an original printed seal, can be adhered thereon to make an original camera.

Also, it is possible to paint the front surface 12a and/or the rear surface 12b.

Different pictures can be drawn on the front surface 12a and the rear surface 12b to make a story.

What is more, by providing a mirror or a comb on the cover 12, the cover 12 can also be utilized as a toilet set.

By adhering a pressed flower or wearing perfume to the cover 12, the camera having a multi-purpose camera can be tasteful.

In addition, by tie-up with an advertiser, advertisement may be placed on the cover 12 to be used as advertising media.

Also, a three-dimensional picture such as a stereo picture book may be inserted between the cover 12 and the camera body 10, and the picture can project according to the movement of opening and closing the cover 12.

Figure 6:
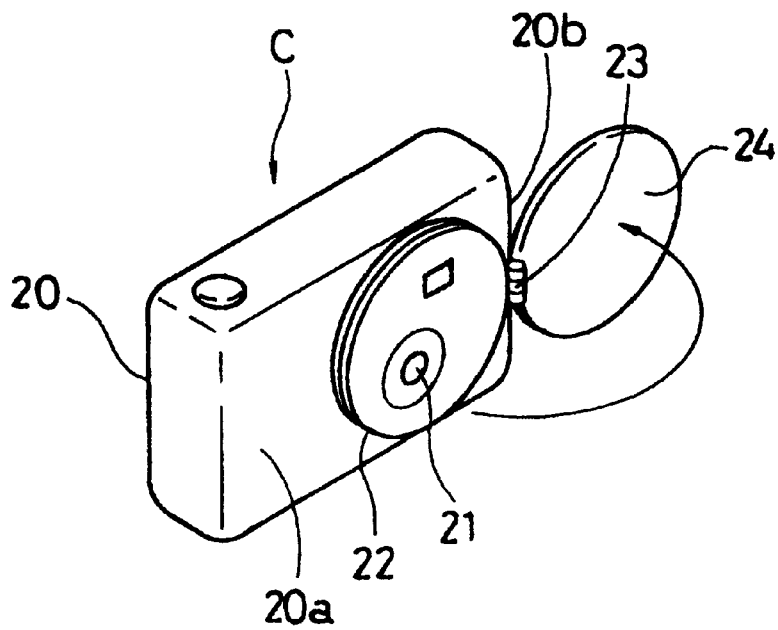
FIGS. 6 and 7 each is a perspective view showing the camera having a multi-purpose cover according to another embodiment of the present invention.
Figure 7:
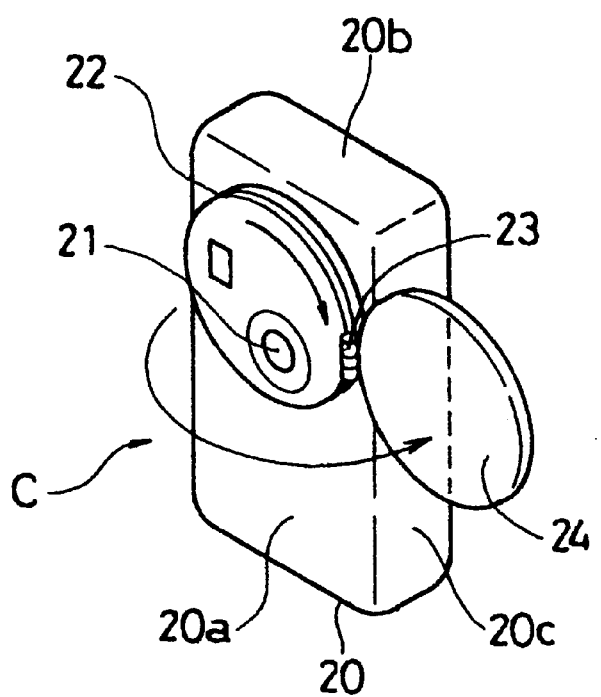

An example shown in FIGS. 6 and 7 is a camera C having a multi-purpose cover in which a rotating ring 22 is provided around the lens 21 residing at the front portion 20a of a camera body 20, a hinge 23 is provided on one portion of the circumference of the rotating ring 22, and a cover 24 is provided on the hinge 23 in such a manner that the cover 24 can be opened and closed by one-touch operation.

As shown in FIG. 6, when a picture is taken while the camera c having a multi-purpose cover being in a horizontal direction, the hinge 23 is positioned at the side portion 20b of the camera body 20, and the cover 24 is opened. At this time, the cover 24 blocks the left eye of the photographer and functions as a holding portion held by the left hand.

As shown in FIG. 7, when a picture is taken while the camera C having a multi-purpose cover being in a vertical direction, the hinge 23 is positioned at the lower portion 20c of the camera body 20, and the cover 24 is opened. At this time, the cover 24 blocks the left eye of the photographer and functions as a holding portion held by the left hand.

Since the cover 24 is closed to cover the lens 21 other than taking a picture, the cover 24 can protect the lens 21 against dust and water-droplets.

Figure 8:
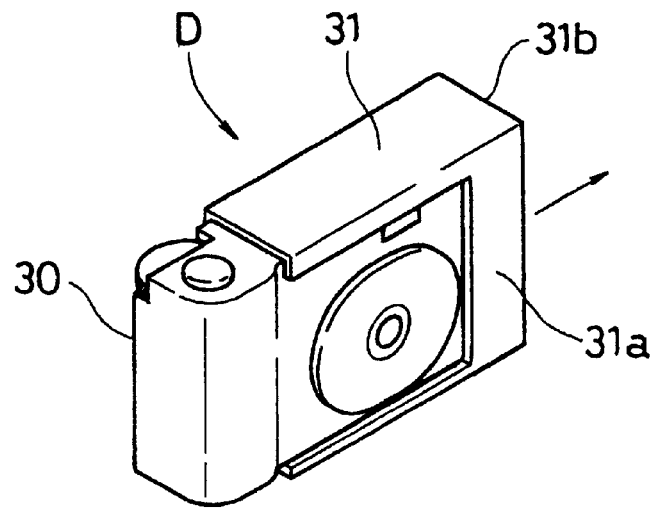
FIGS. 8 and 9 each is a perspective view showing the camera having a multi-purpose cover according to still another embodiment of the present invention.
Figure 9:
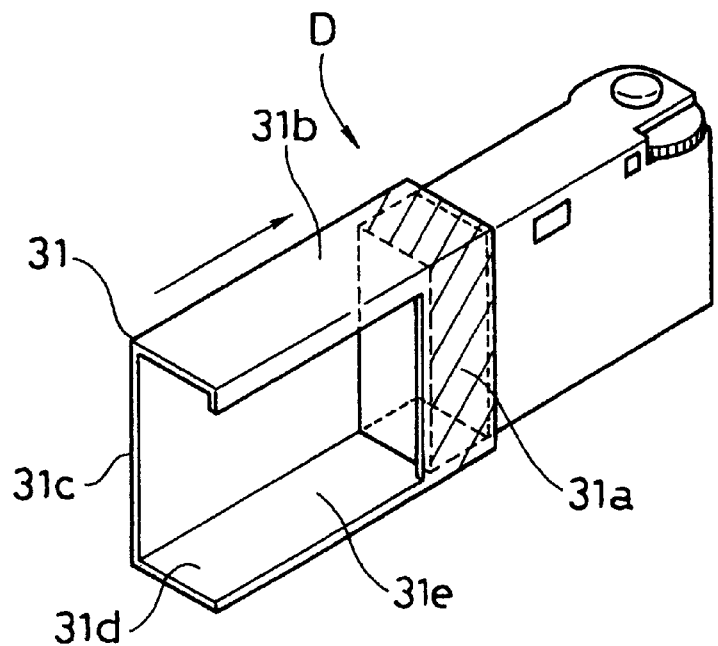

An example shown in FIGS. 8 and 9 is a camera D having a multi-purpose cover having a detachable cover 31 provided on a camera body 30.

The cover 31 is formed into a rectangle tube having four faces 31a, 31b, 31c, and 31d, and the greater part of one face 21a is cut to form a cavity 31e.

As shown in FIG. 8, in the camera D having a multi-purpose, the cover, the cover 31 is provided on the camera body 30 in such a manner that the face 31a is positioned at the front surface.

When a picture is taken, once the cover 31 is taken out of the camera body 30 as shown in FIG. 9, and then a part of the cover 31 (shaded portion in the figure) is fitted to the camera body 30 in such a manner that the cavity 31e is positioned at the rear surface of the camera body 30 from the reverse direction of the camera body 30 toward the arrow. Then, the left eye of the photographer is positioned at the cavity 31e and, thus, the left eye can be blocked by the cover 31.

The cover 31 is particularly benefit when the photographer is in glasses, because the left lens of the glasses enters the cavity 31e.

Figure 10:
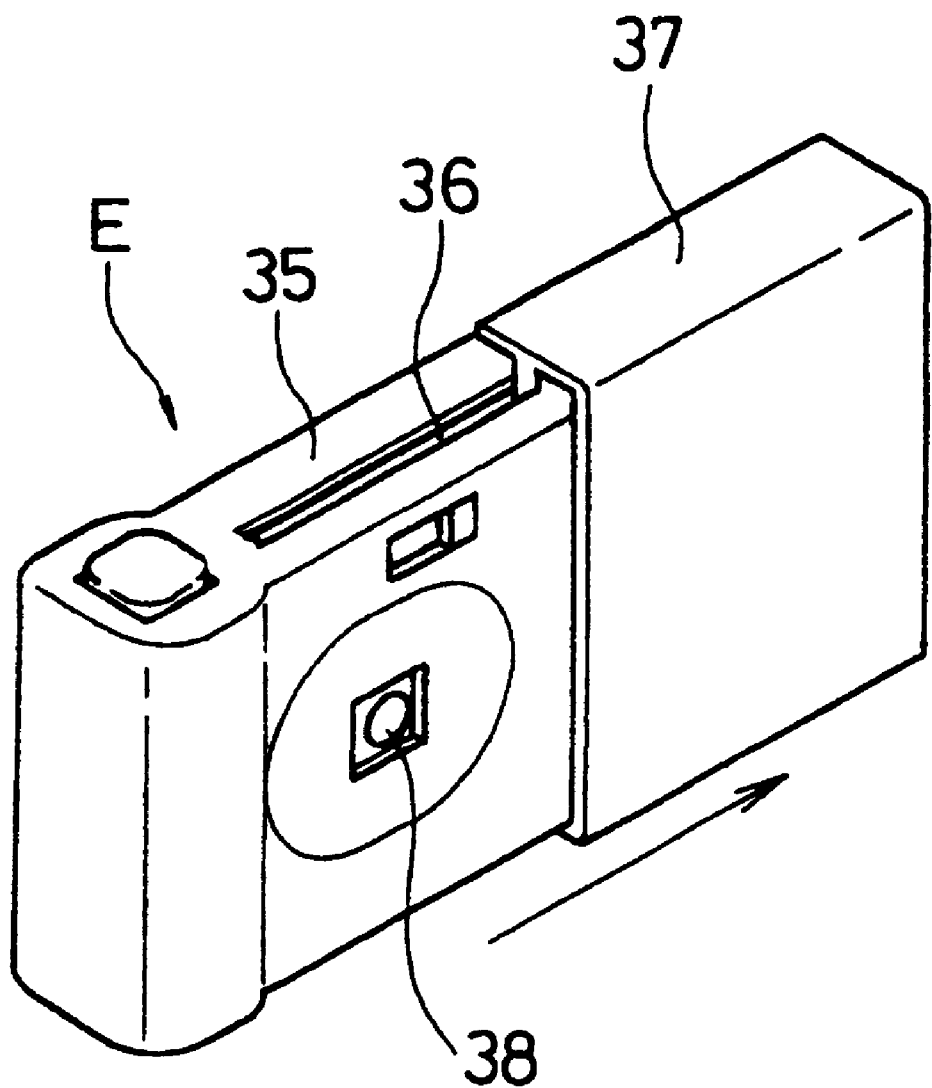
FIG. 10 is a perspective view showing the camera having a multi-purpose cover according to another embodiment of the present invention.

A camera E having a multi-purpose cover as shown in FIG. 10 is produced by providing slide grooves 36 on a camera body 35 and providing a cover 37 which slide within the slide grooves 36 on the camera body 35.

In the camera E having a multi-purpose cover, the cover 37 is drawn when a picture is taken so that the cover 37 blocks the left eye of the photographer. Other than the case of taking a picture, the cover 37 is stored on the camera body 35 to cover the lens 38, to thereby protect the lens against dust and water-droplet.

As described above, according to the present invention, a multi-purpose cover is provided on the camera body, and the multi-purpose camera is provided in such a manner that the cover can outwardly move along the outline of the camera body. Consequently, the left eye of the photographer can be blocked by the cover when taking a picture while opening both eyes, a picture can be taken in the state similar to the state of closing the left eye.

Further, since the multi-purpose cover outwardly moves the outline of the camera body, effects similar to a large-sized camera can be exhibited. To be specific, the camera body can be held in a stabilized manner, making it possible to prevent the camera body from movement as not being held firmly enough and, at the same time, to prevent a finger from being unduly photographed on the taken picture.

Furthermore, according to embodiments of the multi-purpose cover, the cover can be covered with the lens and, thus, the cover exhibits the protection of the lens against dust and water-droplet.

Since a picture can be adhered onto the multi-purpose cover, the camera can be of highly fashionable.

While the invention has been shown and described with reference to the illustrated embodiments and examples, it should be understood that various changes in form and detail may be made without departing from the scope and spirit of the invention which is defined in the appended claims.

What is claimed is:

1. A camera comprising:
   a camera body having a lens and a finder adapted to be viewed by a first one of a user's eyes;
   a cover mounted to said camera body, said cover being rotatably mounted to said camera body and selectively positioned and positively retained in a plurality of positions relative to said camera body, said cover having a height and width greater than a distance between said finder and a bottom portion of said camera body; and
   at least three communication projections formed on a rear surface of said camera body, and
   at least three communication concave portions formed on said cover, each of said communication projections adapted to engage one of said communication concave portions to positively retain said cover with respect to said camera body, wherein said cover may be rotated to at least one of said positions therein blocking a vision of a second one of said user's eyes;
   wherein said cover is selectively positioned and positively retained in one of a first, second and third positions relative to said camera body, wherein when said cover is in said second position said cover covers said finder and each of said three communication projections engages a corresponding one of said communication concave portions, said first position is achieved by rotating said cover substantially 90° in a first direction from said second position and said third position is achieved by rotating said cover substantially 90° in an opposite direction from said second position, wherein said cover exposes said finder when in each of said first and second positions.

2. A camera comprising:
   a camera body having a lens portion and a finder adapted to be viewed by a first one of a user's eyes;
   a ring portion rotatably mounted to said camera body around said lens portion adjacent a front side of said camera body,
   a hinge connected to said ring portion; and
   a cover connected to said hinge thereby permitting compound movement of said cover relative to said camera body, said cover being pivotable substantially 180° about said hinge from a first position covering said lens and substantially parallel to said front face of said camera body, to a second position substantially parallel to and adjacent said front face of said camera body and protruding from an outer profile of said camera body to block a vision of a second one of said user's eyes when said user views said finder.

* * * * *